No. 664,821.  
J. A. PERKINS.  
ROLLER BEARING.  
(Application filed Dec. 4, 1899.)  
Patented Dec. 25, 1900.
(No Model.)
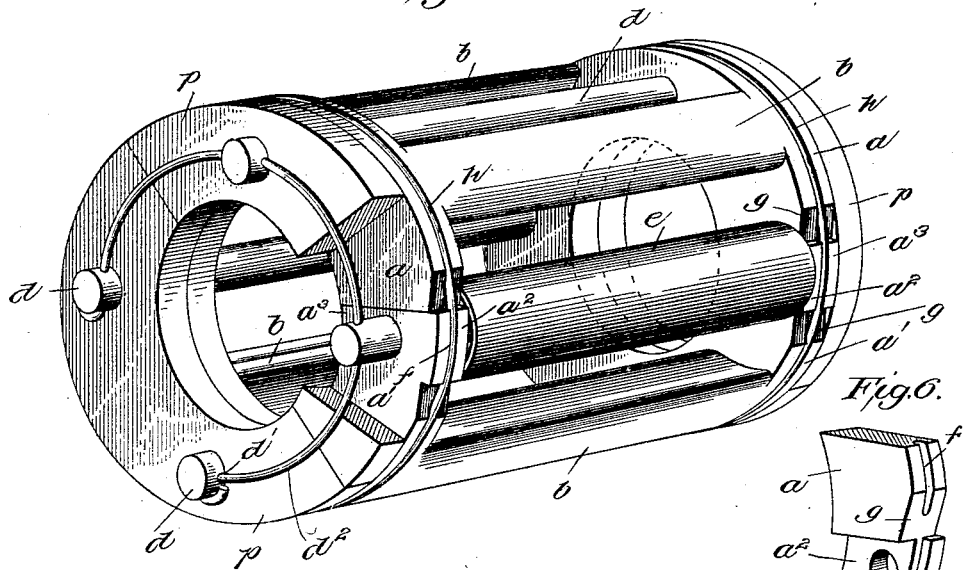
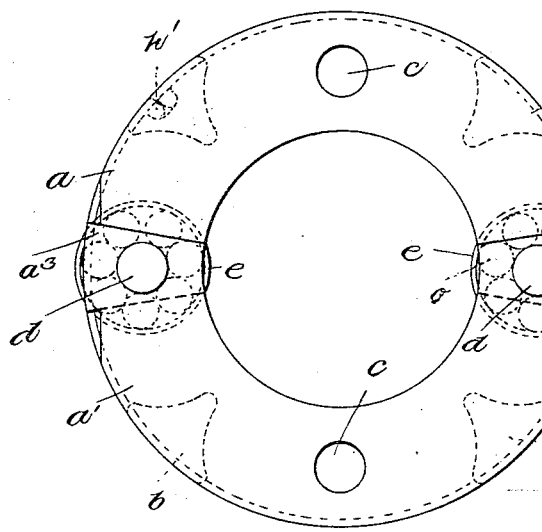
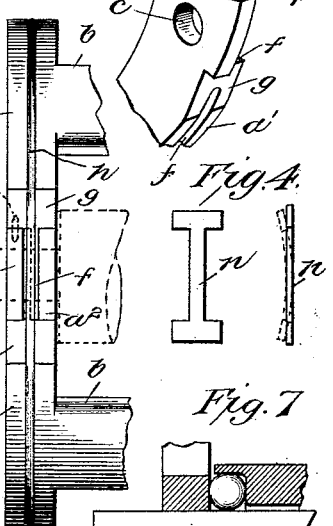
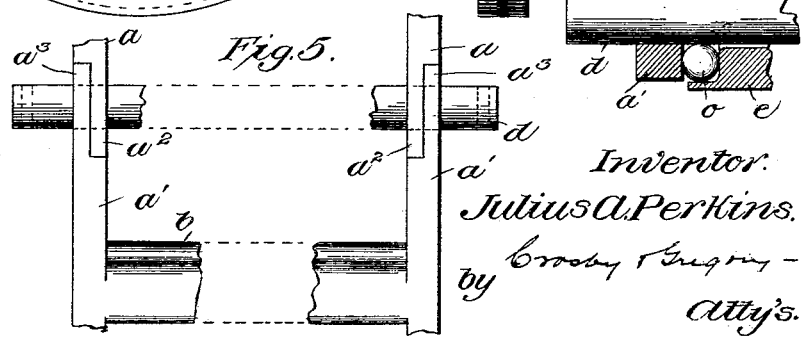
Witnesses:  
J. C. Shaw.  
E. F. Allen.
Inventor:  
Julius A. Perkins.  
by Crosby & Gregory  
Atty's.
THE NORRIS PETERS CO., PHOTO-LITHO., WASHINGTON, D. C.

UNITED STATES PATENT OFFICE.

JULIUS A. PERKINS, OF OMAHA, NEBRASKA, ASSIGNOR TO THE MOFFETT BEARING COMPANY, OF COUNCIL BLUFFS, IOWA.

ROLLER-BEARING.

SPECIFICATION forming part of Letters Patent No. 664,821, dated December 25, 1900.

Application filed December 4, 1899. Serial No. 739,086. (No model.)

*To all whom it may concern:*

Be it known that I, JULIUS A. PERKINS, a citizen of the United States, residing at Omaha, county of Douglas, and State of Nebraska, have invented an Improvement in Roller-Bearings, of which the following description, in connection with the accompanying drawings, is a specification, like letters on the drawings representing like parts.

This invention relates to roller-bearings, and has for its object improvements in the traveling cage and in means for retaining the bearing-rollers in the cage.

Usually rigid cages, constructed to provide spaces for the reception of the bearing-rollers, have circular end walls, and they have to be applied to the journal or shaft by being passed over the end of the journal or clasped about the shaft. The end rings or walls of the cages, held together by spindles about which bearing-rollers rotate, have been pivoted one on or with relation to the other, and so also cages containing cavities to embrace and receive the ends of the rollers have been split, and such segmental cages have been laid in a space in a box. Herein the cage which I seek to improve is of that class wherein the end walls are united rigidly by arms or bars and the end walls are provided with alined holes for the reception of supports or spindles to sustain, center, and aline the bearing-rollers. I have divided this class of cage in the direction of its length into halves or segments, so that it may be readily applied to a journal or shaft occupying, it may be, a position in a box. I have so divided this cage that when its halves or segments are put together one part or segment acts on or with relation to the other part or segment to prevent movement of one part with relation to the other part in the direction of the length of the bearing-rollers, and I have combined with the divided cage locking means, to be described, which further act to maintain said segments each in its proper working position, and I have applied to the ends of the cage locking-segments, through which extend the supports or spindles employed to aline the bearing-rollers, and as herein represented the ends of these spindles are provided with holes, and to lock these spindles in their working position I employ a spindle-locking device which engages a plurality of spindles and prevents the same from rotating in the end walls of the cage.

Figure 1, in perspective and partially broken out, represents a sufficient portion of a revoluble cage and bearing-rollers embodying my invention in one of the best forms now known to me. Fig. 2 is an end view of the cage end. Fig. 3 is an edge view of one of the cage ends and part of one of the bars connected therewith and employed to unite the opposite cage ends. Fig. 4 is a detail of a modified form of locking means. Fig. 5 represents the cage broken out centrally chiefly to show the segments interlocked by arms projecting from the segments. Fig. 6 represents enlarged details of the abutting ends of the divided cage, and Fig. 7 is a detail showing the balls in the chambers at the ends of the bearing-rollers.

In the drawings the cage represented is divided into a plurality of segments $a\ a'$, each segment being firmly and rigidly united by bars $b$ to thereby provide a series of roller-receiving spaces, the segments at the opposite ends of the cage having alined holes $c$ to receive the supports or spindles $d$, to be described, about which the bearing-rollers $e$ revolve. One of the cage-segments, as $a$, is provided with arms $a^2$ at each end, which extend therefrom at a point back of the outer face of the segment, while the other of said segments $a'$ has like arms $a^3$, which are in continuation of the faces of the segments, said arms crossing each other (see Figs. 3 and 5) and preferably having holes through which may be entered one of the supports or spindles $d$, the arms $a^2$, extended from the opposite ends of the segment $a$ of the cage, fitting between the arms $a^3$, extended from the opposite ends of the segment $a'$, said arms being consequently so engaged and locked that the cage-segments are positively restrained from longitudinal movement or from movement in the direction of the length of the bearing-rollers with relation to the other segments. To yet further retain the segments in contact and prevent their separation, I have provided the peripheries of the segments of the cage with like grooves $f$ and I have cut across the periphery of each segment, just behind the parts thereof from which said arms $a^2\ a^3$ start to leave, notches $g$, said grooves being also represented as extended longitudinally of the arm $a^2$. The grooves $f$ are entered by a locking device, represented in Fig. 1 as a ring $h$, preferably of wire or spring-steel, it surrounding both segments and preferably having its ends $h'$ inturned into suitable notches made in the segments, the said locking device overcoming any tendency of the segments to separate or to slide one on the other longitudinally.

It is essential that the cage-segments when put together retain their operative position, and this cannot be safe-guarded too highly, and I therefore provide a second means to prevent any tendency of one cage-segment to slide longitudinally on or over the other in use, and this safeguard against such longitudinal motion is represented in Fig. 3 as a dowel-pin $m$, entering suitable holes in the abutting ends of the cage-segments.

To further provide against any possibility of the separation of the segmental cages and as a safeguard coöperating with the locking device $h$, the spindles $d$ are represented as extended through holes in the arms $a^2$ and $a^3$, it being preferred that said spindles or equivalent transverse studs stand in holes made in said arms; but this invention would not be departed from in all instances if said spindles or studs were omitted from the arms and the spindles were held in parts of the cage ends away from said arms.

Instead of in all instances having a locking device, as $h$, to extend entirely about both segments I may as an equivalent device employ a locking device, as $n$, (see Fig. 4, full lines,) made I-shaped, it being slightly curved in the direction of its length, as shown by dotted lines, after the curved body thereof has been applied in the groove $a^2$, the head ends of said locking device entering the notches $g$ referred to and preventing the separation of the cage-segments when handling the same and also restraining longitudinal movement of one segment on the other. Preferably the locking device $n$ will be inserted into the groove in the portion $a^2$ before it is curved, as stated, and by curving it into the form represented in Fig. 4 after putting it into said groove the inner edges of the head, coacting with the shoulders at the bottoms of the notches $g$, serve to retain the locking device in its operative position. So, also, if desired, I may employ both of the locking devices $h$ and $n$ simultaneously, and in such event I would cut the grooves to receive the locking device $n$ a little deeper, so that the devices $h$ might overlie the body of the locking device $n$ lying in its groove; but in the majority of the instances either one answers the purpose.

The supports or spindles $d$ are represented as provided at their ends with suitable recesses $d'$, and said spindles are extended through the alined holes $c$ in the ends of the cage, the supports when being put into position in the cage passing through the center bores of the bearing-rollers $e$, the said rollers being countersunk or chambered at their ends to receive antifriction means, herein represented as a series of balls $o$, which, entering said chambers or countersinks, are thereby interposed between the rollers and the ends of the cage and also between the flanges of the rollers and the supports or spindles. These supports or spindles are of a length sufficient to extend not only through the end walls of the cage, but also to receive upon them locking-segments $p$, two at each end of the cage, said segments being so applied to the split ends of the cage that the splits at said ends are overlapped, and thereafter the openings or recesses $d'$ at the ends of the spindles are entered by a spindle-locking device $d^2$, which is preferably so constructed as to engage a plurality of spindles and prevent them from axial rotation in the cage, the spindle-locking means herein employed being represented as engaging the entire set of spindles.

I have not herein shown the journal or shaft surrounded by the cage or the box to surround the cage and its bearing-rollers, but said journal or shaft and said box may be of any usual or suitable construction and preferably divided, especially if the traveling cage is to be applied to a journal or shaft in place.

The traveling roller-carrying cage herein described may be used in any sort of roller-bearing construction instead of any of the usual cages, and the invention herein contained so far as it applies to the sectional cage may be used in connection with any form of spindles, whether of the specific character herein described or of other forms wherein the ends of the spindles may be upset or otherwise properly secured either in the ends of the cage-segments or outside of the segmental locking-plate.

Having described my invention, what I claim as new, and desire to secure by Letters Patent, is—

1. In a roller-bearing, a divided cage composed of segments united rigidly by bars, said segments being provided at their meeting ends with grooves and notches, and a locking device entering said grooves and notches and preventing the separation of said segments one from the other.

2. In a roller-bearing, a divided cage composed of bars having segments fixed to their opposite ends, the peripheries of said segments connected with both ends of the bars being grooved, and locking devices entering the grooves of each pair of abutting segments.

3. In a roller-bearing, a divided cage composed of segments connected rigidly by bars, each segment having in its periphery a groove, combined with a locking device entering said grooves and substantially encircling said segments, both ends of each locking device, the latter having surrounded both segments, entering suitable openings in one of the segments to thereby aid in retaining the locking device in its operative position.

4. In a roller-bearing, a cage composed of end walls united rigidly by bars and provided with alined holes, a series of bearing-rollers, and a series of roller-alining spindles in said holes, and locking means at the outer ends of said spindles to retain the same in said cage.

5. In a roller-bearing, a cage composed of end walls united rigidly by bars, said end walls having a series of alined holes, a series of bearing-rollers, roller-alining means located in said holes, and locking devices to engage the exposed ends of said roller-alining means outside the walls of said cage to retain the said alining means not only in said cage but against axial rotation therein.

6. In a roller-bearing, a cage composed of end walls united rigidly by bars, said end walls having a series of alined holes for the reception of spindles, combined with a series of bearing-rollers, a series of spindles sustained in said alined holes, and locking devices to engage the exposed ends of said spindles and retaining the same not only in said cage but against axial rotation in the cage.

7. In a roller-bearing, a cage composed of segmental end walls united rigidly by bars, and having a series of spindle-receiving holes in alinement, combined with locking-segments applied to the outer faces of the end walls, said segments crossing the abutting ends of the cage-segments, said spindles extended through said end walls and locking-segments, and a series of bearing-rollers revolving about said spindles.

8. In a roller-bearing, a cage composed of segmental end walls united rigidly by bars, and having a series of spindle-receiving holes in alinement, combined with spindles extended through said end walls, a series of bearing-rollers revoluble about said spindles, and a spindle-locking device coöperating with a plurality of said spindles to retain them in the cage and also to prevent the rotation of said spindles in said cage.

In testimony whereof I have signed my name to this specification in the presence of two subscribing witnesses.

JULIUS A. PERKINS.

Witnesses:
GEO. W. GREGORY,
MARGARET A. DUNN.